United States Patent
Li (10) Patent No.: US 10,606,331 B2
(45) Date of Patent: Mar. 31, 2020

(54) MICROCONTROLLER UNIT AND PROTECTION METHOD FOR EFT EVENTS

(71) Applicant: Nuvoton Technology Corporation, Hsinchu (TW)

(72) Inventor: Wen-Yi Li, New Taipei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/270,863

(22) Filed: Feb. 8, 2019

(65) Prior Publication Data

US 2019/0391190 A1 Dec. 26, 2019

(30) Foreign Application Priority Data

Jun. 26, 2018 (TW) .............................. 107121879 A (51) Int. Cl.
*G06F 1/30* (2006.01)
(52) U.S. Cl.
CPC ................ *G06F 1/30* (2013.01); *G06F 1/305* (2013.01)
(58) Field of Classification Search
CPC ........................................................ G06F 1/30
See application file for complete search history.

(56) References Cited

U.S. PATENT DOCUMENTS

| 6,621,311 | B2 * | 9/2003 | Jeon .......................... | G06F 1/30 |
| | | | | 327/142 |
| 8,000,076 | B2 | 8/2011 | Guthrie et al. | |
| 8,020,049 | B2 | 9/2011 | Asuncion et al. | |
| 8,860,394 | B2 * | 10/2014 | Houston ................ | H02M 3/156 |
| | | | | 323/285 |
| 9,812,945 | B2 * | 11/2017 | Li ............................ | H02M 1/32 |
| 2009/0037755 | A1 * | 2/2009 | Nakano ..................... | G06F 1/30 |
| | | | | 713/322 |

FOREIGN PATENT DOCUMENTS

| CN | 104821708 A | 8/2015 |
| TW | 563299 B | 11/2003 |
| TW | 200608677 A | 3/2006 |
| TW | 201043972 A | 12/2010 |
| TW | 201401011 A | 1/2014 |

OTHER PUBLICATIONS

Taiwanese Office Action in application No. 107121879 dated Mar. 6, 2019; pp. 1-5.

* cited by examiner

*Primary Examiner* — Patrick O Neill
(74) *Attorney, Agent, or Firm* — Muncy, Geissler, Olds & Lowe, PC (57) ABSTRACT

A microcontroller unit (MCU) is provided. The MCU includes a reset circuit, a clock circuit, a detection circuit, a counter and a control circuit. The detection circuit detects a first EFT event, and when a first EFT event is detected, the detection circuit generates a first block signal. The counter is coupled to the detection circuit, and when the counter receives the first block signal, the counter starts to count. The control circuit is coupled to the reset circuit, the clock circuit and the counter, and receives the first block signal from the counter. When the control circuit receives the first block signal, the control circuit maintains output signals of the reset circuit and the clock circuit in a prior state, in which the output signals have not been influenced by the first EFT event, until the count number of the counter reaches a default value.

17 Claims, 7 Drawing Sheets

MICROCONTROLLER UNIT AND PROTECTION METHOD FOR EFT EVENTS

CROSS REFERENCE TO RELATED APPLICATIONS

This application claims priority of TW Patent Application No. 107121879 filed on Jun. 26, 2018, the entirety of which is incorporated by reference herein.

BACKGROUND OF THE INVENTION

Field of the Invention

The invention generally relates to a protection technology for Electrical Fast Transient (EFT) events, and more particularly, to an EFT event protection technology in which when the EFT event is detected, the output signals of the reset circuit and the clock circuit of a microcontroller unit (MCU) may be temporarily maintained in a state in which the output signals have not been influenced by the EFT event.

Description of the Related Art

During the microcontroller unit (MCU) is operated, some Electrical Fast Transient (EFT) events may occur. When the EFT events occur, the instantaneous high voltage noise will be generated due to the EFT events, and the instantaneous high voltage noise may make the wrong operation of the MCU occur, as a result, the MCU may break down. For example, the reset circuit of the MCU may fail due to the EFT events, and the write error for the clock circuit of the MCU may occur due to the EFT events.

Traditionally, in order to prevent the EFT events, a passive protection method may be adopted for preventing the EFT events. For example, a de-bounce circuit may be configured in the MCU to cancel the reset signal of the reset circuit influenced by the EFT events, and a filter circuit may be configured in the MCU to filter the high-frequency clock signal of the clock circuit influenced by the EFT events. However, the result of the passive protection method may easily be influenced by the variations of the process, voltage and temperature (PVT). Therefore, the passive protection method cannot ensure that the MCU can pass the EFT test (or EFT standard) in all different operating environments.

BRIEF SUMMARY OF THE INVENTION

The invention provides microcontroller units (MCUs) and methods for preventing EFT events to overcome the problems described above.

An embodiment of the invention provides a microcontroller unit (MCU). The MCU comprises a reset circuit, a clock circuit, a detection circuit, a counter and a control circuit. The detection circuit detects a first Electrical Fast Transient (EFT) event, and when a first EFT event is detected, generates a first block signal. The counter is coupled to the detection circuit, and when the counter receives the first block signal, the counter starts to count. The control circuit is coupled to the reset circuit, the clock circuit and the counter, and receives the first block signal from the counter. When the control circuit receives the first block signal, the control circuit maintains output signals of the reset circuit and the clock circuit in a prior state, in which the output signals have not been influenced by the first EFT event, until the count number of the counter reaches a default value.

An embodiment of the invention provides a microcontroller unit (MCU). The MCU comprises a reset circuit, a clock circuit, a detection circuit, and a control circuit. The detection circuit detects a first Electrical Fast Transient (EFT) event, and when a first EFT event is detected, generates a first block signal. The control circuit is coupled to the reset circuit, the clock circuit and the detection circuit, and receives the first block signal from the detection circuit. When the control circuit receives the first block signal, the control circuit maintains output signals of the reset circuit and the clock circuit in a prior state, in which the output signals have not been influenced by the first EFT event, until the first EFT event is terminated.

An embodiment of the invention provides a method for preventing Electrical Fast Transient (EFT) events. The method is applied to a microcontroller unit (MCU), and the method comprises the steps of detecting whether a first EFT event occurs using a detection circuit of the MCU; generating a first block signal when a first EFT event is detected; starting to count on a counter of the MCU; and maintaining, using a control circuit of the MCU, output signals of a reset circuit and a clock circuit of the MCU in a prior state, in which the output signals have not been influenced by the first EFT event, until the count number of the counter reaches a default value.

Other aspects and features of the invention will become apparent to those with ordinary skill in the art upon review of the following descriptions of specific embodiments of the MCUs and methods for preventing EFT events.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
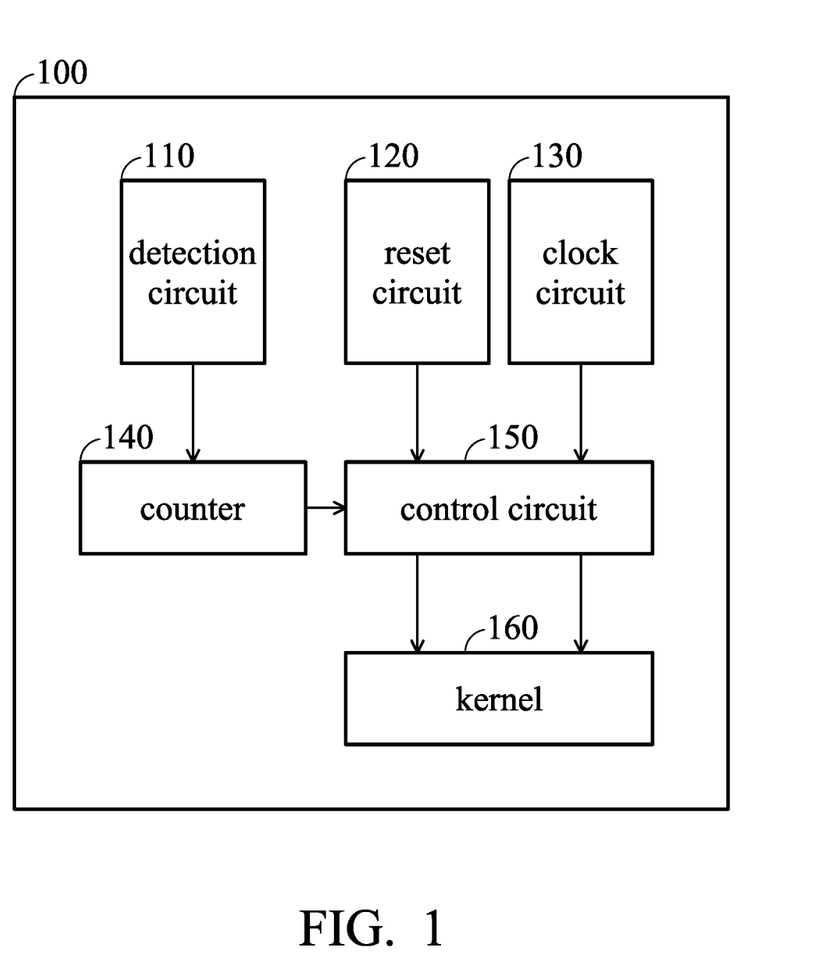
FIG. 1 is a block diagram of a microcontroller unit (MCU) 100 according to an embodiment of the invention.

FIG. 1 is a block diagram of a microcontroller unit (MCU) 100 according to an embodiment of the invention. As shown in FIG. 1, the MCU 100 may comprise a detection circuit 110, a reset circuit 120, a clock circuit 130, a counter 140, a control circuit 150 and a kernel 160. It should be noted that in order to clarify the concept of the invention, FIG. 1 presents a simplified block diagram in which only the elements relevant to the invention are shown. However, the invention should not be limited to what is shown in FIG. 1. The MCU 100 may comprise other elements.

As shown in FIG. 1, the detection circuit 110 may be coupled to the counter 140, and the counter 140 may be coupled to the control circuit 150. The control circuit 150 may be coupled to the reset circuit 120, the clock circuit 130 and the kernel 160, and it may transmit the output signals of the reset circuit 120 and the clock circuit 130 to the kernel 160 of the MCU 100.

According to the embodiments of the invention, in normal operation (i.e. the detection circuit 110 does not detect the Electrical Fast Transient (EFT) events), the control circuit 150 may receive the output signals from the reset circuit 120 and the clock circuit 130. Then, the control circuit 150 may transmit the output signals received from the reset circuit 120 and the clock circuit 130 to the kernel 160 to execute the instructions comprised in the output signals of the reset circuit 120 and the clock circuit 130.

According to an embodiment of the invention, when the detection circuit 110 detects an EFT event (e.g. a first EFT event), the detection circuit 110 may generate a block signal (e.g. a first block signal) to temporarily maintain the output signals of the reset circuit 120 and the clock circuit 130 in the prior state (i.e. in the state, the output signals have not been influenced by the EFT event). After the detection circuit 110 generates the block signal, the detection circuit 110 may transmit the block signal to the counter 140. When the counter 140 receives the block signal, the counter 140 may transmit the block signal to the control circuit 150 and start to count. When the control circuit 150 receives the block signal, the control circuit 150 may maintain the output signals of the reset circuit 120 and the clock circuit 130 in the prior state. The control circuit 150 does not return to its normal operation for transmitting the output signals of the reset circuit 120 and the clock circuit 130 to the kernel 160 until the count number of the counter 140 achieves the default value. In other words, when the control circuit 150 receives the block signal, the control circuit 150 may not transmit the output signals that are affected by the EFT event to the kernel 160; instead, the control circuit 150 may transmit the output signals which generate before the EFT event to the kernel 160, enabling the MCU 100 to operate normally without the influence of EFT event.

More specifically, when the EFT event occurs, the reset circuit 120 may be influenced by the EFT events, as a result, a wrong reset signal may be generated. The wrong reset signal may lead to the wrong reset for the MCU 100. Therefore, when the detection circuit 110 detects the EFT event, in order to avoid the wrong reset for the MCU 100, the detection circuit 110 may generate the block signal to make the control circuit 150 can maintain the output signal of the reset circuit 120 in the state which has not been influenced by the EFT event.

Furthermore, when the event occurs, the clock circuit 130 may be influenced by the EFT events, as a result, the frequency of the output signal (i.e. clock signal) generated by clock circuit 130 may be too fast. The MCU 100 may break down, when it operates in the clock signal whose frequency is too fast. Therefore, when the detection circuit 110 detects the EFT event, in order to avoid the wrong operation of the MCU 100 that is generated because the frequency of the clock signal generated by clock circuit 130 is too fast, the detection circuit may generate the block signal to make the control circuit 150 can maintain the output signal of the clock circuit 130 in the state which has not been influenced by the EFT event. In other words, the control circuit 150 may slow down the frequency of the output signal of the clock circuit 130 to avoid the frequency of the output signal of the clock circuit 130 is too fast.

According to an embodiment of the invention, when the detection circuit 110 detects a new EFT event (e.g. a second EFT event) before the count number of the counter 140 achieves the default value, the detection circuit 110 may generate a new block signal (e.g. a second block signal). When the counter 140 receives the new block signal, the counter 140 may re-count from 0. In other words, when a new EFT event occurs, even the count for prior EFT event has not been completed, the counter 140 may still re-count from 0.

Figure 2A:
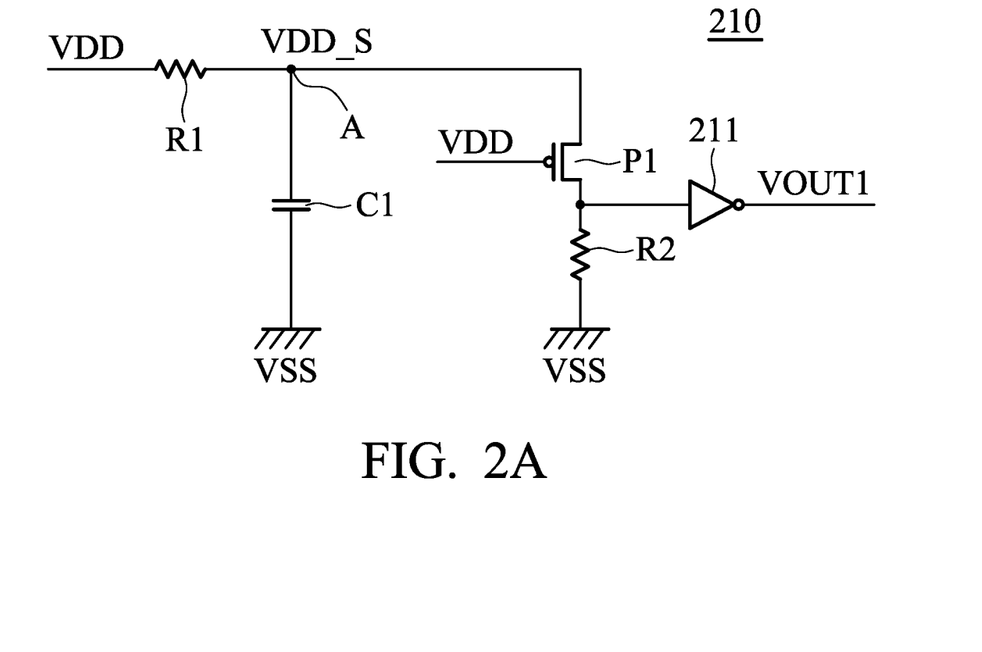
FIGS. 2A-2D are circuit diagrams of the detection circuit 110 according to an embodiment of the invention.
Figure 2B:
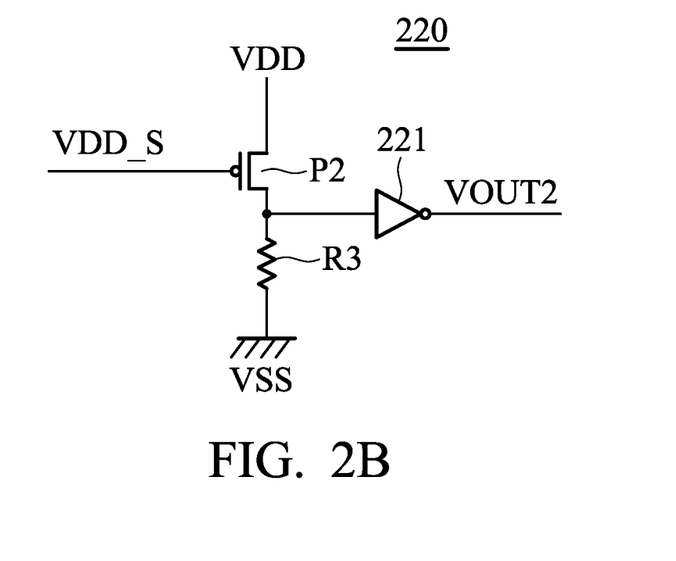
Figure 2C:
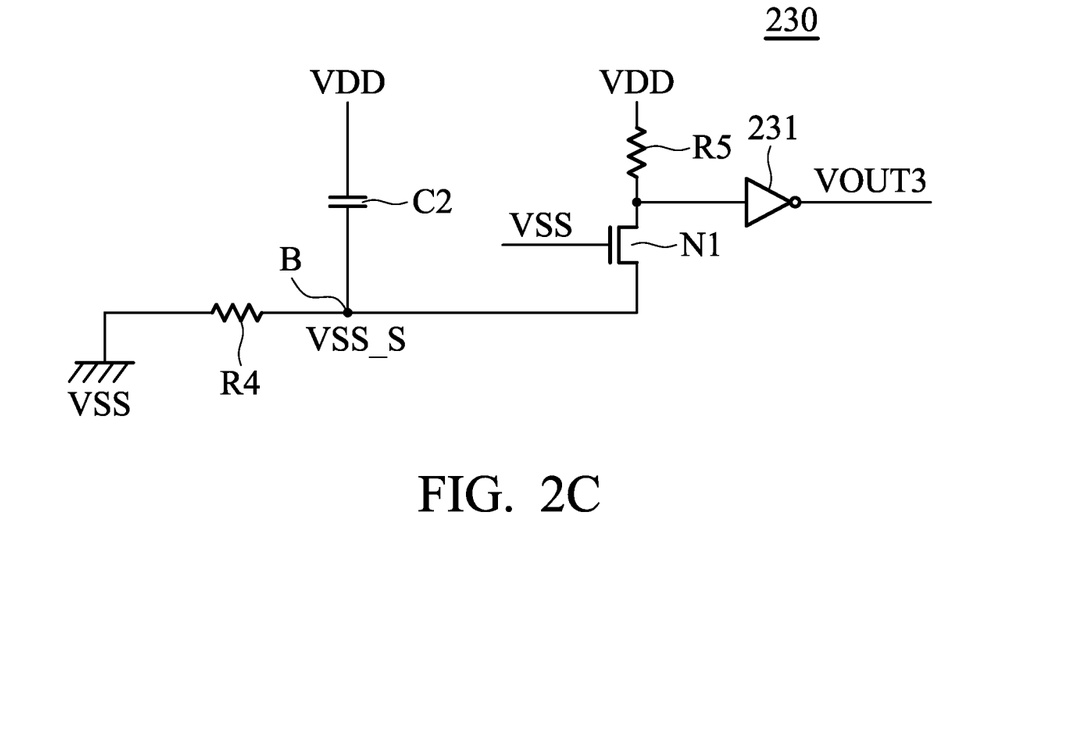
Figure 2D:
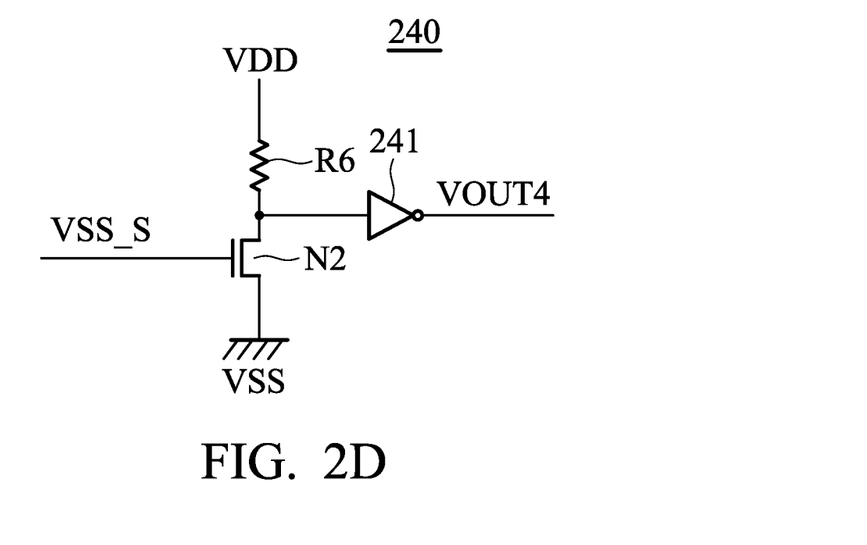
Figure 3A:
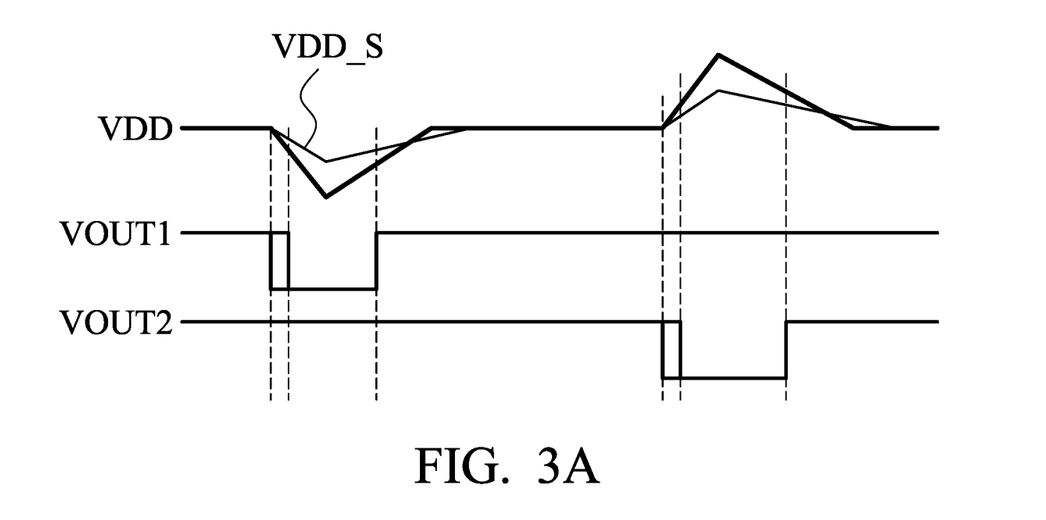
FIGS. 3A-3B are schematic diagrams for the output signals of the first detection circuit 210, the second detection circuit 220, the third detection circuit 230, and the detection circuit 240 according to an embodiment of the invention.
Figure 3B:
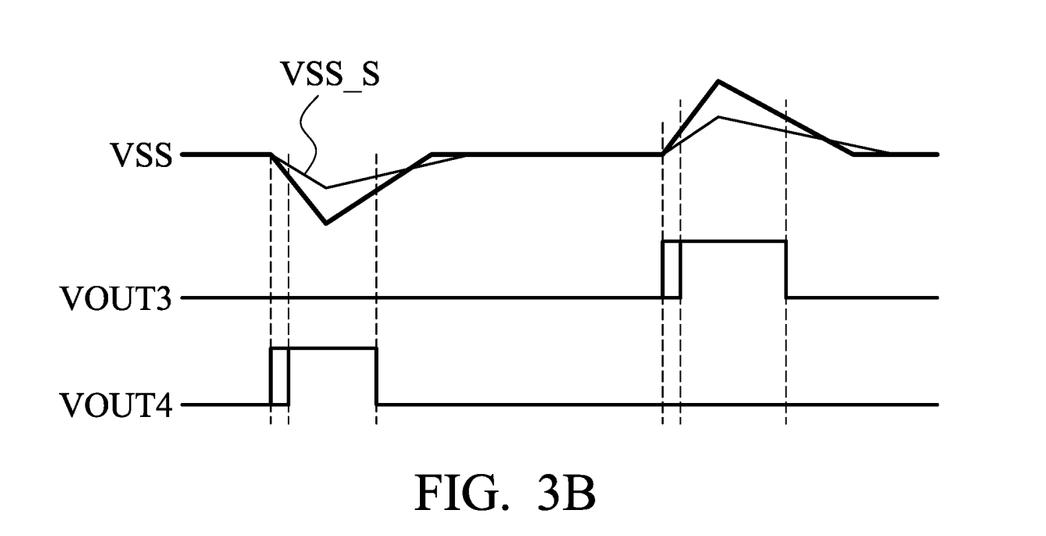

FIGS. 2A-2D are circuit diagrams of the detection circuit 110 according to an embodiment of the invention. As shown in FIGS. 2A-2D, the detection circuit 110 may comprise a first detection circuit 210, a second detection circuit 220, a third detection circuit 230, and a detection circuit 240. FIGS. 3A-3B are schematic diagrams for the output signals of the first detection circuit 210, the second detection circuit 220, the third detection circuit 230, and the detection circuit 240 according to an embodiment of the invention. According to an embodiment of the invention, the detection device 110 may detect different types of EFT events through the first detection circuit 210, the second detection circuit 220, the third detection circuit 230, and the detection circuit 240. Details are discussed in following embodiments.

According to an embodiment of the invention, the first detection circuit 210 is configured to detect the negative EFT events in the source voltage VDD. As shown in FIG. 2A, the first detection circuit 210 comprises a first resistor R1, a second resistor R2, a first capacitor C1, a first PMOS P1, and a first inverter 211, wherein the first node voltage VDD_S is the voltage at the node A, and the first node voltage VDD_S is generated by the source voltage VDD being processed by the RC circuit composed of the first resistor R1 and the first capacitor C1. The source of the first PMOS P1 may receive the first node voltage VDD_S, the gate of the first PMOS P1 may receive the source voltage VDD, and the drain of the first PMOS P1 is coupled to the second resistor R2. Referring to the left side of the FIG. 3A, when a negative EFT event is detected in the source voltage VDD (i.e. the source voltage VDD immediately moves in the negative direction), the influences for the source voltage VDD and the first node voltage VDD_S of the first detection circuit 210 may be different, and when the voltage difference between the source voltage VDD and the first node voltage VDD_S, the first PMOS P1 is enabled, and the output end VOUT1 of the first inverter 211 may output a pulse signal (i.e. the block signal).

According to an embodiment of the invention, the second detection circuit 220 is configured to detect the positive EFT events. As shown in FIG. 2B, the second detection circuit 220 may comprise a second PMOS P2, a third resistor R3 and a second inverter 221. The source of the second PMOS P2 may receive source voltage VDD, the gate of the second PMOS P2 may receive the first ode voltage VDD_S (the same as the first node voltage VDD_S shown in FIG. 2A), and the drain of the second PMOS P2 is coupled to the third resistor R3. Referring to the right side of FIG. 3A, when a positive EFT event is detected in the source voltage VDD (i.e. the source voltage VDD immediately moves in the positive direction), the influences for the source voltage VDD and the first node voltage VDD_S of the second detection circuit 220 may be different, and when the voltage difference between the source voltage VDD and the first node voltage VDD_S, the second PMOS P2 is enabled, and the output end VOUT2 of the second inverter 221 may output a pulse signal (i.e. the block signal).

According to an embodiment of the invention, the third detection circuit 230 is configured to detect the positive EFT events in the ground voltage VSS. As shown in FIG. 2C, the third detection circuit 230 comprises a fourth resistor R4, a fifth resistor R5, a second capacitor C2, a first NMOS N1, and a third inverter 231, wherein the second node voltage VSS_S is the voltage at the node B, and the second node voltage VSS_S is generated by the ground voltage VSS being processed by the RC circuit composed of the fourth resistor R4 and the second capacitor C2. The drain of the first NMOS N1 may be coupled to the fifth resistor R5, the gate of the first NMOS N1 may receive the ground voltage VSS, and the source of the first NMOS N1 receives the second node voltage VSS_S. Referring to the right side of the FIG. 3B, when a positive EFT event is detected in the ground voltage VSS (i.e. the ground voltage VSS immediately moves in the positive direction), the influences for the ground voltage VSS and the second node voltage VSS_S of the third detection circuit 230 may be different, and when the voltage difference between the ground voltage VSS and the second node voltage VSS_S, the first NMOS N1 is enabled, and the output end VOUT3 of the third inverter 231 may output a pulse signal (i.e. the block signal).

According to an embodiment of the invention, the fourth detection circuit 240 is configured to detect the negative EFT events in the ground voltage VSS. As shown in FIG. 2D, the fourth detection circuit 240 comprises a second NMOS N2, a sixth resistor R6, and a fourth inverter 241. The drain of the second NMOS N2 may be coupled to the sixth resistor R6, the gate of the second NMOS N2 may receive the second node voltage VSS_S (the same as the second node voltage VSS_S shown in FIG. 2C), and the source of the second NMOS N2 may receive the ground voltage VSS. Referring to the left side of the FIG. 3B, when a positive EFT event is detected in the ground voltage VSS (i.e. the ground voltage VSS immediately moves in the negative direction), the influences for the ground voltage VSS and the second node voltage VSS_S of the fourth detection circuit 240 may be different, and when the voltage difference between the ground voltage VSS and the second node voltage VSS_S, the second NMOS N2 is enabled, and the output end VOUT4 of the fourth inverter 241 may output a pulse signal (i.e. the block signal).

According to an embodiment of the invention, in order to adapt to different EFT ranks, the RC circuit (e.g. the RC circuit composed of the first resistor R1 and the first capacitor, and the RC circuit composed of the fourth resistor R4 and second capacitor C2) can be adjusted according to the different ranks of the EFT events specified in the EFT standard.

Figure 4A:
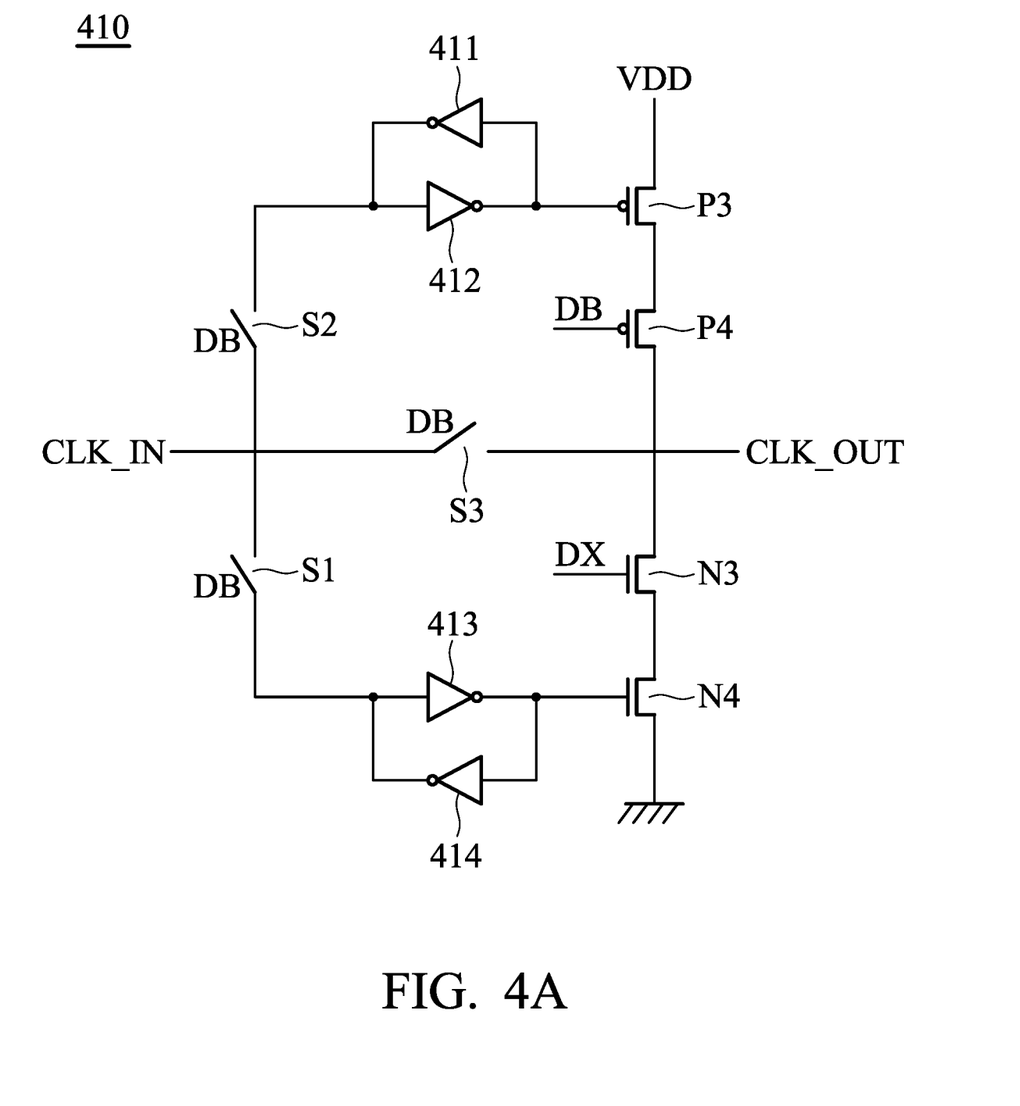
FIGS. 4A-4B are circuit diagrams of the control circuit 150 according to an embodiment of the invention.
Figure 4B:
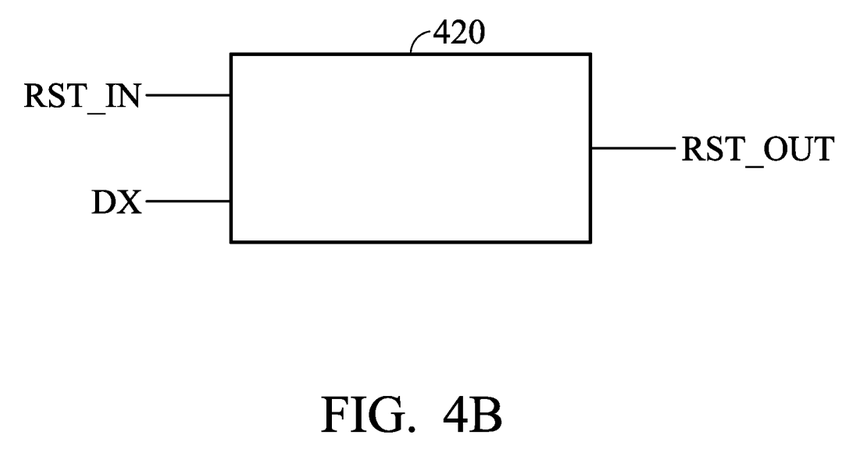

FIGS. 4A-4B are circuit diagrams of the control circuit 150 according to an embodiment of the invention. As shown in FIGS. 4A-4B, the control circuit 150 may comprise a first control circuit 410 and a second circuit 420. The first control circuit 410 is coupled to the counter 140, the clock circuit 130 and the kernel 160 to control the output signal of the clock circuit 130 outputting to the kernel 160. The first control circuit 410 may receive the input signal CLK_IN from the clock circuit 130, and output the output signal CLK_OUT to the kernel 160. The second control circuit 420 is coupled to the counter 140, the reset circuit 120 and the kernel 160 to the output signal of the reset circuit 120 outputting to the kernel 160. The second control circuit 420 may receive the input signal RST_IN from the reset circuit 120, and output the output signal RST_OUT to the kernel 160.

According to an embodiment of the invention, as shown in FIG. 4A, the first control circuit 410 may comprise a first switch S1, a second switch S2, a third switch S3, a fifth inverter 411, a sixth inverter 412, a seventh inverter 413, an eighth inverter 414, a third PMOS P3, a fourth PMOS P4, a third NMOS N3 and a fourth NMOS N4. The first switch S1, the second switch S2, the third switch S3 and the gate of the third PMOS P3 may receive the signal DB from the counter 140, and the gate of the third NMOS N3 may receive the signal DX from the counter 140, wherein the signal DB is the backward signal of the signal DX, and the signal DB and the signal DX may be regarded as the block signals the first control circuit 410 receives from the counter 140.

When the EFT event does not happen (i.e. DX=0 and DB=1), the first switch S1, the second switch S2 and the third switch S3 are enabled (ON), the output signal CLK_OUT of the first control signal 410 is equal to the current input signal CLK_IN of the first control signal 410, and the input signal CLK_IN may be temporarily stored in the third PMOS P3 or the third NMOS N3. When the EFT event happens (i.e. DX=1 and DB=0), the first switch S1, the second switch S2 and the third switch S3 are disabled (OFF), the output signal CLK_OUT of the first control signal 410 may be the input signal CLK_IN in the prior state.

According to an embodiment of the invention, the second control circuit 420 may be a logic circuit, and the second control circuit 420 may receive the signal DX from the counter 140, wherein the signal DX may be regarded as the block signal the second control circuit 420 receives from the counter 140. When the EFT event does not happen (i.e. DX=0), the first switch S1, the output signal RST_OUT of the second control circuit 420 may be the input signal RST_IN in the prior state.

According to an embodiment of the invention, the detection circuit 110 may be directly coupled to the controller 150. That is to say, in the embodiment of the invention, the counter may be not configured in the MCU 100. In the embodiment, when the control circuit receives the block signal from the detection circuit 110, the control circuit 150 may determine the duration of the EFT event. The control circuit 150 may maintain the output signals of the reset circuit 120 and the clock circuit 130 in the prior state in which the output signals have not been influenced by the EFT event, until the EFT event terminated. In addition, in the embodiment, when a new EFT event is detected before the current EFT event is terminated, the detection circuit 110 may generate a new block signal, and the control circuit 150 may re-determine the duration of the EFT event according to the new block signal. Then, the control circuit 150 may maintain the output signals of the reset circuit 120 and the clock circuit 130 in the prior state in which the output signals have not been influenced by the new EFT event, until the new EFT event terminated.

Figure 5:
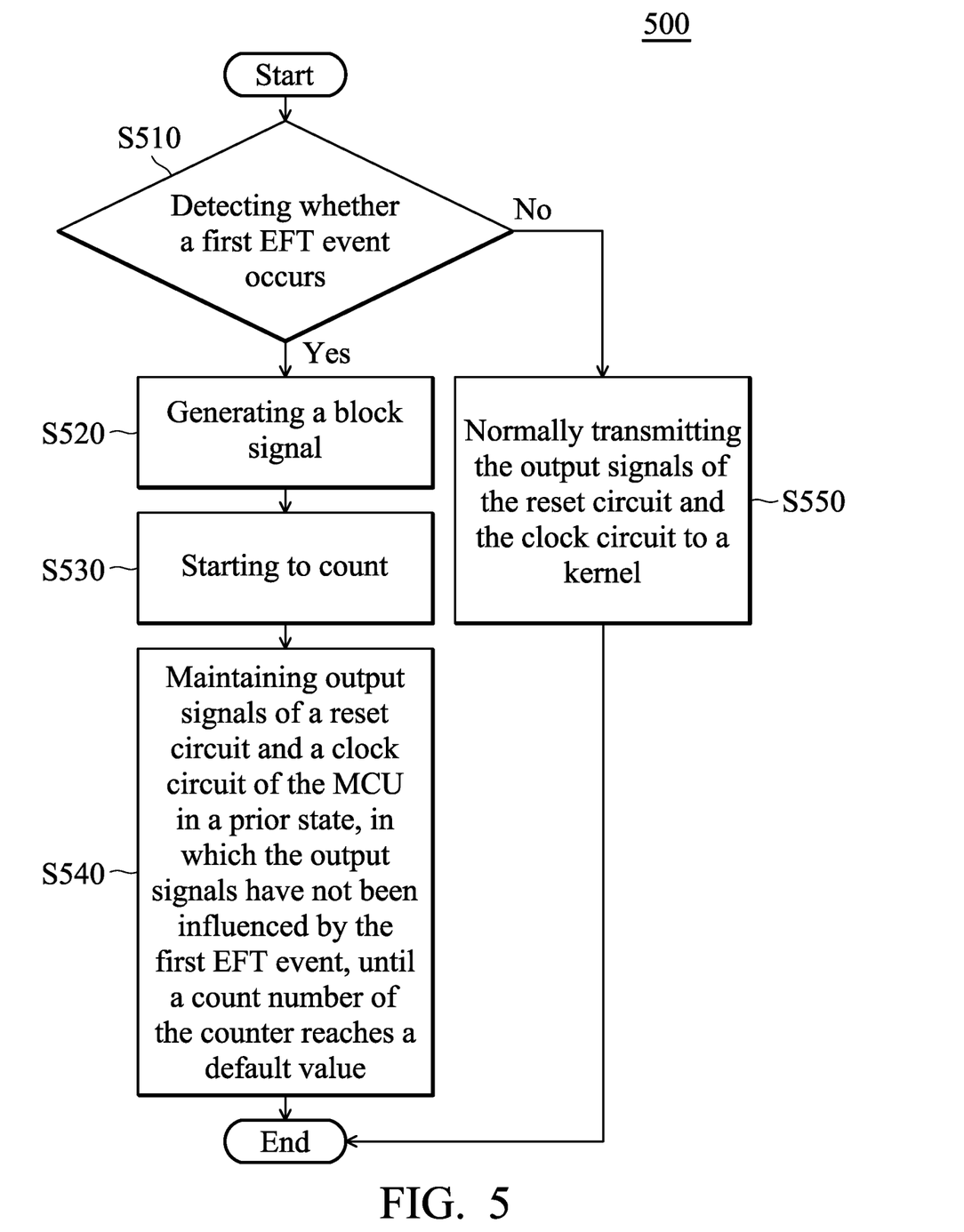
FIG. 5 is a flow chart 500 illustrating a protection method for EFT events according to an embodiment of the invention.

FIG. 5 is a flow chart 500 illustrating a protection method for EFT events according to an embodiment of the invention. The protection method for EFT events can be applied to the MCU 100 of the invention. In step S510, a detection circuit of the MCU 100 may detect whether an EFT event occurs. When an EFT event is detected by the detection circuit, step S520 is performed. In step S520, a block signal is generated by the detection circuit. In step S530, a counter of the MCU 100 may start to count. In step S540, a control circuit of the MCU 100 may maintain the output signals of a reset circuit and a clock circuit of the MCU 100 in the prior state in which the output signals have not been influenced by the new EFT event, until the count number of the counter reaches the default value.

When no EFT event is detected, step S550 is performed. In step S550, the control circuit may normally output the output signals of the reset circuit and the clock circuit to the kernel of MCU 100.

According to an embodiment of the invention, the protection method for EFT events further comprises that when a new EFT event is detected before the count number of the counter reaches the default value, the detection circuit may generate a new block signal, and the counter may re-count according to the new block signal. In other words, when a new EFT event is detected, the protection method for EFT events may return to step S520, and re-perform following steps.

According to an embodiment of the invention, the protection method for EFT events further comprises that when the count number of the counter reaches the default value, the control circuit may start to normally output the output signals of the reset circuit and the clock circuit to the kernel of MCU 100.

According to an embodiment of the invention, the protection method for EFT events further comprises that a first detection circuit of the detection circuit is configured to detect the negative EFT events in the source voltage, a second detection circuit of the detection circuit is configured to detect the positive EFT events in the source voltage, a third detection circuit of the detection circuit is configured to detect the positive EFT events in the ground voltage, and a fourth detection circuit of the detection circuit is configured to detect the negative EFT events in the ground voltage. According to an embodiment of the invention, the protection method for EFT events further comprises that when the EFT event occurs, the first detection circuit, the second detection circuit, the third detection circuit, or the fourth detection circuit is configured to generate a pulse signal to be the block signal.

According to an embodiment of the invention, the protection method for EFT events further comprises that a first control circuit of the control circuit is configured to control the output signal of the clock circuit outputting to a kernel of MCU 100, and a second control circuit of the control circuit is configured to control the output signal of the reset circuit outputting to the kernel of MCU 100. According to an embodiment of the invention, the protection method for EFT events further comprises that when the EFT event occurs, the first control circuit is configured to output the control signal of the clock circuit in the prior state, in which the output signal of the clock circuit has not been influenced by the EFT event, to the kernel. Furthermore, when the EFT event occurs, the second control circuit is configured to output the control signal of the reset circuit in the prior state, in which the output signal of the reset circuit has not been influenced by the EFT event, to the kernel.

According to the protection methods for EFT events provided in the embodiments of the invention, when the EFT event occurs, the detection circuit of the MCU may generate a block signal to make the counter start to count and make the control circuit maintain the output signals of the reset circuit and the clock circuit in the prior state. The control circuit does not return to its normal operation for transmitting the output signals of the reset circuit and the clock circuit until the count number of the counter reaches the default value. Therefore, according to the protection methods for EFT events provided in the embodiments of the invention, the influences of the EFT events can be prevented actively, and during the duration of the counter counting, the MCU still can maintain its operation.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A microcontroller unit (MCU), comprising:
    a reset circuit;
    a clock circuit;
    a detection circuit, detecting a first Electrical Fast Transient (EFT) event, and when the first EFT event is detected, generating a first block signal;
    a counter, coupled to the detection circuit, and when receiving the first block signal, starting to count; and
    a control circuit, coupled to the reset circuit, the clock circuit and the counter, and receiving the first block signal from the counter,
    wherein when the control circuit receives the first block signal, the control circuit maintains output signals of the reset circuit and the clock circuit in a prior state, in which the output signals have not been influenced by the first EFT event, until a count number of the counter reaches a default value.

2. The MCU of claim 1, wherein when a second EFT event is detected by the detection device before the count number of the counter reaches the default value, the detection circuit generates a second block signal and the counter re-counts according to the second block signal.

3. The MCU of claim 1, wherein when the count number of the counter reaches the default value, the control circuit normally transmits the output signals of the reset circuit and the clock circuit to a kernel of the MCU.

4. The MCU of claim 1, wherein the detection circuit comprises:
a first detection circuit, configured to detect negative EFT events in a source voltage;
a second detection circuit, configured to detect positive EFT events in the source voltage;
a third detection circuit, configured to detect positive EFT events in a ground voltage; and
a fourth detection circuit, configured to detect negative EFT events in the ground voltage.

5. The MCU of claim 4, wherein when the first EFT event occurs, the first detection circuit, the second detection circuit, the third detection circuit, or the fourth detection circuit generates a pulse signal to be the first block signal.

6. The MCU of claim 1, wherein the control circuit comprises:
a first control circuit, controlling the output signal of the clock circuit outputting to a kernel of the MCU; and
a second control circuit, controlling the output signal of the reset circuit outputting to the kernel,
wherein when the first event occurs, the first control circuit outputs the output signal of the clock circuit in the prior state, in which the output signal of the clock circuit has not been influenced by the first EFT event, to the kernel, and the second control circuit outputs the output signal of the reset circuit in the prior state, in which the output signal of the reset circuit has not been influenced by the first EFT event, to the kernel.

7. A microcontroller unit (MCU), comprising:
a reset circuit;
a clock circuit;
a detection circuit, detecting a first Electrical Fast Transient (EFT) event, and when the first EFT event is detected, generating a first block signal; and
a control circuit, coupled to the reset circuit, the clock circuit and the detection circuit, and receiving the first block signal from the detection circuit,
wherein when the control circuit receives the first block signal, the control circuit maintains output signals of the reset circuit and the clock circuit in a prior state, in which the output signals have not been influenced by the first EFT event, until the first EFT event is terminated.

8. The MCU of claim 7, wherein when a second EFT event is detected by the detection device before the first EFT event is terminated, the detection circuit generates a second block signal, and according to the second block signal, the control circuit maintains the output signals of the reset circuit and the clock circuit in the prior state, in which the output signals have not been influenced by the first EFT event.

9. A method for preventing Electrical Fast Transient (EFT) events, applied to a microcontroller unit (MCU), comprising:
detecting whether a first EFT event occurs by a detection circuit of the MCU;
generating a first block signal when the first EFT event is detected;
starting to count on a counter of the MCU; and
maintaining, by a control circuit of the MCU, output signals of a reset circuit and a clock circuit of the MCU in a prior state, in which the output signals have not been influenced by the first EFT event, until a count number of the counter reaches a default value.

10. The method for preventing the EFT events of claim 9, further comprising:
when a second EFT event is detected by the detection device before the count number of the counter reaches the default value, generating a second block signal; and
re-counting on the counter according to the second block signal.

11. The method for preventing the EFT events of claim 9, further comprising:
when the count number of the counter reaches the default value, normally transmitting the output signals of the reset circuit and the clock circuit to a kernel of the MCU.

12. The method for preventing the EFT events of claim 9, further comprising:
detecting negative EFT events in a source voltage by a first detection circuit of the detection circuit;
detecting positive EFT events in the source voltage by a second detection circuit of the detection circuit;
detecting positive EFT events in a ground voltage by a third detection circuit of the detection circuit; and
detecting negative EFT events in the ground voltage by a fourth detection circuit of the detection circuit.

13. The method for preventing the EFT events of claim 12, further comprising:
when the first EFT event occurs, generating a pulse signal to be the first block signal by the first detection circuit, the second detection circuit, the third detection circuit, or the fourth detection circuit.

14. The method for preventing the EFT events of claim 9, further comprising:
controlling the output signal of the clock circuit outputting to a kernel of the MCU by a first control circuit of the control circuit; and
controlling the output signal of the reset circuit outputting to the kernel by a second control circuit of the control circuit.

15. The method for preventing the EFT events of claim 14, further comprising:
wherein when the first event occurs, the first control circuit outputs the output signal of the clock circuit in the prior state, in which the output signal of the clock circuit has not been influenced by the first EFT event, to the kernel.

16. The method for preventing the EFT events of claim 14, further comprising:
wherein when the first event occurs, the second control circuit outputs the output signal of the reset circuit in the prior state, in which the output signal of the reset circuit has not been influenced by the first EFT event, to the kernel.

17. The method for preventing the EFT events of claim 14, further comprising:
wherein when the first event occurs, the first control circuit outputs the output signal of the clock circuit in the prior state, in which the output signal of the clock circuit has not been influenced by the first EFT event, to the kernel, and the second control circuit outputs the output signal of the reset circuit in the prior state, in which the output signal of the reset circuit has not been influenced by the first EFT event, to the kernel.

* * * * *